(12) United States Patent
Akizuki et al.

(10) Patent No.: US 7,913,384 B2
(45) Date of Patent: Mar. 29, 2011

(54) METHOD OF PREPARING A WIRE HARNESS PRODUCTION

(75) Inventors: Kenichiro Akizuki, Nishikamo-gun (JP); Shuji Ono, Kosai (JP); Tetsuya Ishiguro, Kosai (JP); Masaya Uchida, Kosai (JP); Yasuhiro Mochizuki, Kosai (JP); Eiji Asaoka, Kosai (JP); Takeshi Ishikawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 997 days.

(21) Appl. No.: 11/011,204

(22) Filed: Dec. 15, 2004

(65) Prior Publication Data

US 2005/0102832 A1     May 19, 2005

Related U.S. Application Data

(62) Division of application No. 10/262,847, filed on Oct. 3, 2002, now Pat. No. 6,845,553.

(30) Foreign Application Priority Data

Oct. 9, 2001 (JP) ................ P2001-311563

(51) Int. Cl.
*H01R 43/00* (2006.01)

(52) U.S. Cl. .............. 29/857; 29/33 M; 29/749; 29/865; 29/866; 29/867; 29/861; 29/564.4

(58) Field of Classification Search .............. 29/749, 29/33 M, 865, 866, 867, 861, 564.4, 857
See application file for complete search history.

(56) References Cited

U.S. PATENT DOCUMENTS

| | | | |
|---|---|---|---|
| 5,153,839 A | 10/1992 | Cross | |
| 5,355,581 A | 10/1994 | Soriano | |
| 5,687,477 A | 11/1997 | Soriano | |
| 6,163,958 A * | 12/2000 | Suzuki | ............ 29/866 |
| 6,169,934 B1 | 1/2001 | Nakayama et al. | |
| 6,658,312 B1 | 12/2003 | Hagiyama | |

FOREIGN PATENT DOCUMENTS

| | | |
|---|---|---|
| JP | 8-185430 | 7/1996 |
| JP | 2607467 | 2/1997 |
| JP | 2000-163453 | 6/2000 |
| JP | 2000-353181 | 12/2000 |

* cited by examiner

*Primary Examiner* — Rick K Chang
(74) *Attorney, Agent, or Firm* — Sughrue Mion, PLLC

(57) ABSTRACT

A method of preparing a wire harness production by providing standard wiring pattern information related to a first pattern including parts, electric circuits and wirings of a standard type vehicle, and generating modified wiring pattern information related to at least another pattern in which at least one of the parts, the electric circuits, and the wirings of a first pattern is altered.

2 Claims, 10 Drawing Sheets

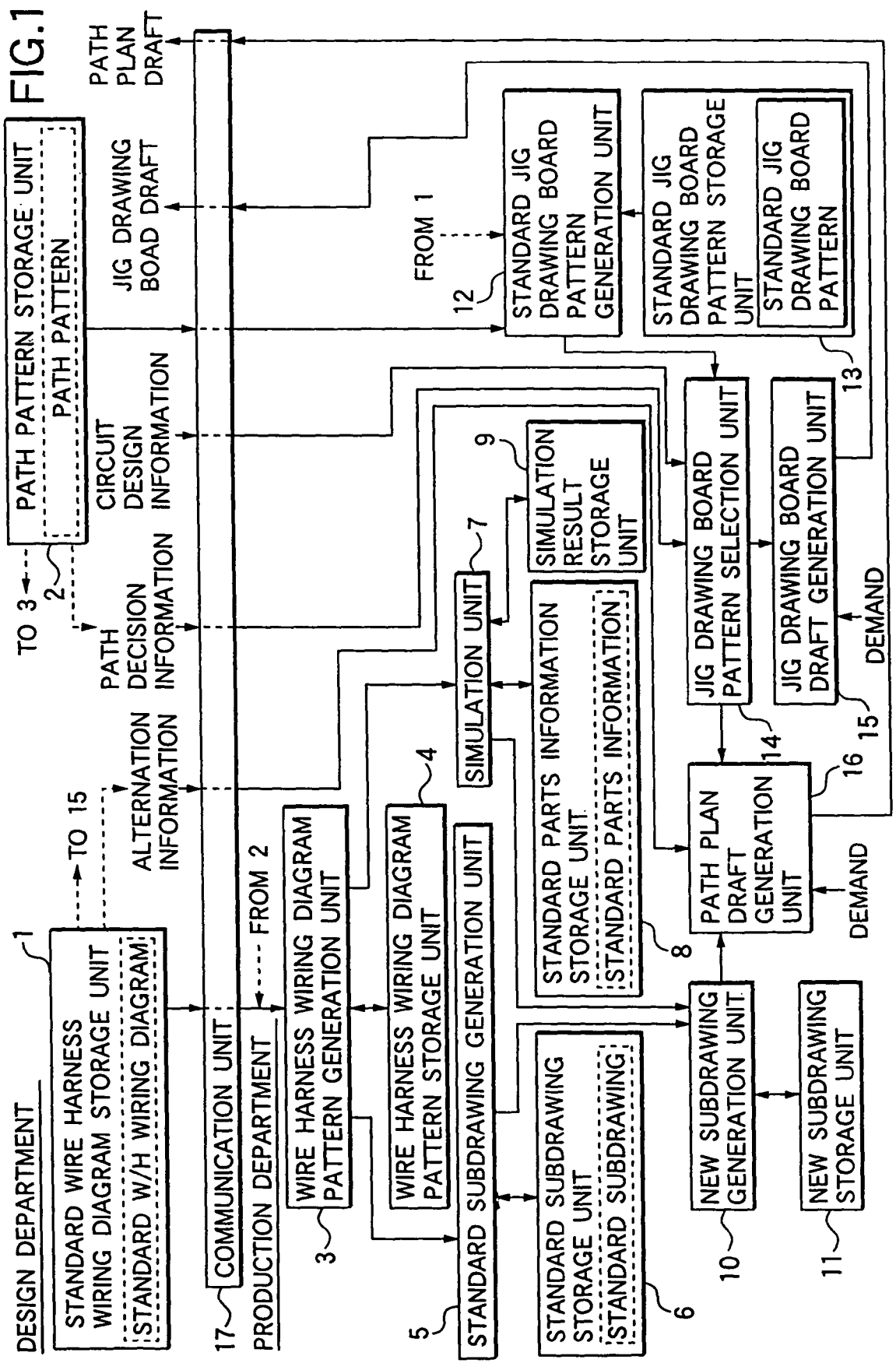

| 1 0 | PATTERN | RAD | D/L | P/W |
|---|---|---|---|---|
| 0 | A | ○ | ○ | ○ |
| 0 | B | | | ○ |
| 1 | C | | ○ | |

PB1
31
31

| 1 0 | PATTERN | RAD | D/L | P/W |
|---|---|---|---|---|
| 0 | A | ○ | ○ | ○ |
| 0 | B |  | ○ | ○ |
| 1 | C |  | ○ |  |

32

| | PATTERN | RAD | D/L | P/W | E/L |
|---|---|---|---|---|---|
| 0 | A | ○ | ○ | ○ | ○ |
| 0 | B | | | ○ | |
| 1 | C | | ○ | | |

| 1 0 0 | PATTERN | RAD | D/L | P/W |
|---|---|---|---|---|
| 0 | A | ○ | ○ | ○ |
| 0 | B |  |  | ○ |
| 1 | C |  | ○ |  |

| PATH PATTERN | JIG DRAWING BOAD PATTERN |
|---|---|
| GA | LA |
| GB | LB |
| GC | LC |

FIG.9B

| PLATFORM | CAR MODEL | PART | STEERING WHEEL | GROMMET | PROTECTOR | R/B | PART No. |
|---|---|---|---|---|---|---|---|
| AAA | XXXX | 10001- | R | 2001-0001 | | | 10001-AAAAA |
| BBB | YYYY | 10002- | R | | 2002-0002 | | 10002-BBBBB |
| CCC | ZZZZ | 10003- | L | | | | 10003-CCCCC |
| DDD | XYXY | 10004- | L | | | 3003-0003 | 10004-DDDDD |

METHOD OF PREPARING A WIRE HARNESS PRODUCTION

This is a Divisional of application Ser. No. 10/262,847 filed Oct. 3, 2002 now U.S. Pat. No. 6,845,553.

BACKGROUND OF THE INVENTION

The present invention generally relates to a system for preparing a wire harness production and, more particularly, to a system for preparing a production of a vehicle wire harness.

In preparation for production of a wire harness to be wired in a vehicle, inefficient interchanges of various information and repetitions of such interchanges occur between a design department and a production department, or between a carmaker and a parts maker. This causes a problem that such production preparation needs a very long preparation period. This problem is described below with reference to FIG. 10.

FIG. 10 is an explanatory diagram illustrating an example of an operation to be performed in a production preparation time in which preparation for production of a related vehicle wire harness is performed. At a design department shown in FIG. 10, during this time, for example, design, fabrication, and evaluation of a wire harness are performed for the production preparation. On the other hand, at a production department, for instance, manufacturing drawing, assembly-jig drawing and process study are performed. Incidentally, the design department and the production department may be present in the same company. However, alternatively, the design department and the production department may be provided so that the design department is provided in a carmaker, while the production department is provided in a parts maker commissioned by the carmaker to produce wire harnesses.

In this production preparation time, as described in step S1a shown in FIG. 10, first, the design department makes design department diagrams referred to as, for example, a wire-harness skeleton diagram, an intraconnector terminal wiring diagram, and a circuit information diagram according to circuit diagrams consisting of system wiring diagrams, which describe relevant electric circuits, path diagrams, which describe wiring paths of a wire harness, and specifications and associated data. Then, such design department diagrams are provided from the design department to the production department.

In the production department receiving this design department diagrams, the preparation, checking and review of various drawings, and the study of a wire harness process are performed in a production preparation process P1. At a stage of preparing various drawings, wire harness production drawings, subdrawings, and jig drawings are prepared according to the design department drawings received from the design department. Incidentally, a processing drawing and wire specifications are cited as the wire harness production drawings. A sub numbered sub-assembly drawing is cited as the subdrawing. A jig layout drawing, a jig production drawing and a component list are cited as the jig drawings. Further, product cost accounts are cited as other drawings.

Moreover, at a checking stage of the production preparation process P1, the preparation of a working drawing for an inspection table, operating instructions, and an important point drawing is performed by referring to the design department drawings. Furthermore, at a study stage, product study, workability verification, and evaluation, and production system study are performed. At the product study, study of dimensional setting of wire correction of protectors, study of the size and dimensions of a protective layer, and study of style of packing are performed. At the workability study, evaluation of wiring procedure and time, evaluation of working procedure and time, and evaluation of layout of the inspection table are performed. Further, at the production system study, pressure-welding and production facility study and manufacturing system study are performed. Furthermore, at the wire harness process study, wire harness process layout and contact study are performed. Particularly, line design, which concerns personnel assignment and work distribution, and facility evaluation, which concerns the number of facilities and also concerns production patterns, are performed.

Incidentally, irregular change requests issued from the design department are taken into consideration in the study and evaluation. Further, upon completion of such various studies and evaluations, the production department feeds back results thereof to the design department as demands.

In parallel with the production preparation process P1 of the production department, in step S1b, the design department performs wire harness design, which includes study of wiring of a wire harness circuit and a path, and assembly and evaluation of an actual car. Then, each time when change processing to be performed occurs, the change request is issued to the production department. Further, the design department prepares design department drawings again in step S2a by referring to the demands fed back from the design department. Subsequently, the design department provides the prepared design department drawings to the production department.

Then, when receiving the design department drawings, the production department performs a production preparation process P2 similar to the production preparation process P1 again. Similarly, the design department performs the wire harness design and the assembly and evaluation of an actual car again in step S2b, and issues a change request to the production department again, if necessary. Such processes to be respectively performed at the design department and the production department, and interactions therebetween are repeatedly performed until a production preparation process P3 based on the design department drawing prepared by the design department in step S3a and on the change request issued according to the wire harness design and to the assembly and evaluation of an actual car is finished so that the production department feeds back no demands to the design department.

When such processes, which relate to the preparation for production of a wire harness and are performed in the design department and the production department, and the interactions between both the departments are finished, the production department arranges provisions, such as necessary members and jigs, in step P4. Then, in step P5, the appointed production department performs practical production of a wire harness according to a predetermined manufacturing process. Furthermore, upon completion of production of a wire harness of a predetermined part of a predetermined type of vehicle, the production department makes shipment of the wire harness in step P6.

As described above, in the preparation of production of a wire harness, there are various processes, which are performed in the design department and the production department, and interactions to be performed therebetween. Further, it is frequent that similar processes and interactions are repeatedly performed. Thus, the production preparation is time-consuming and needs a large number of man-hours. Further, preparations of production of a wire harness, which respectively correspond to the types of vehicle, are performed separately from one another. Consequently, such production preparation does not effectively utilize a great number of similar databases. More particularly, the design department of such a related system has drawbacks in that it takes time to prepare the design department drawings, that a wire harness shown in a scheme drawing does not correspond with an actual one at the assembly and evaluation, and that a diameter of a wire harness, which is based on a path plan, often differs from that of an actual wire harness. Moreover, the production department of the related system has many drawbacks in that the production department cannot start a preparation process without the design department drawing, and that there are many hindrances to reduction in a preparation time, for example, many manual operations are caused and many iterative tasks are generated correspondingly to various kinds of inspections, studies and change requests.

SUMMARY OF THE INVENTION

It is therefore an object of the present invention to provide a system for preparing a wire harness production enabled to considerably reduce time needed for preparation for production of a wire harness by promoting the sharing and standardization of a database and by substantially reducing iterative tasks.

In order to achieve the above object, according to the present invention, there is provided the system for preparing a wire harness production comprising:

standard wire harness wiring pattern information related to a first pattern including parts, electric circuits, and wirings of a standard type vehicle;

a modified wiring pattern generator, which generates modified wire harness wiring pattern information related to at least one second pattern in which at least one of the parts, the electric circuits, and the wirings of the first pattern is altered;

a parts information storage, which stores parts specification information including specifications of the parts, the electric circuits and the wiring included in the second patterns;

a simulator, which simulates whether each of the second patterns is practical while referring to the parts specification information;

a sub wiring pattern modifier, which modifies at least one of first sub patterns constituting the first pattern to at least one of second sub patterns so as to constitute the second pattern judged as practical by the simulator;

wire harness path pattern information related to a plurality of wire harness path patterns of the standard type vehicle;

a jig arrangement pattern information generator, which generates jig arrangement pattern information related to jig arrangement patterns prepared by applying at least one sub jig arrangement pattern to each of the wire harness path patterns;

path decision information, which selects one wire harness path pattern among the plurality of wire harness path patterns;

alternation information which indicates at least one of alternation portions altered from the first pattern;

a jig arrangement pattern selector, which selects one jig arrangement pattern corresponding to the selected wire harness path pattern among the plurality of wire harness path patterns; and a path plan generator, which generates a path plan by integrating the modified second sub pattern having the alternation portions which is indicated in the alternation information and the selected jig arrangement pattern.

In the above configuration, when the alternation information and the path decision information are received, suitable path plan is immediately provided. That is, this system can generate data, which is necessary for the production of the wire harness, by alternating only alternation portions relating thereto according to the preliminarily provided standard database. Therefore, the number of interchanges of data between departments and that of iterative tasks caused at each change in a process of preparation for production of a wire harness, which are very large in a related system, are reduced. Consequently, a preparation time and the number of man-hours are considerably reduced.

Preferably, the system further comprising a jig arrangement board plan generator, which generates a jig arrangement board plan in which a three dimensional extend elevation is based on the selected jig arrangement pattern.

Preferably, the sub wiring pattern modifier modifies the at least one of first sub patterns according to at least one of data concerning automatic machine conditions, special construction method verification, production requirements, and optimum circuit study.

In the above configuration, a more accurate path plan is provided.

Preferably, the system further comprising a wiring pattern information storage, which stores the standard wire harness wiring pattern information; and a path pattern information storage, which stores the wire harness path pattern information.

In the above configuration, the production preparation time is more reduced by preliminarily generating or storing a plurality of standard subdrawings, standard parts information, and standard jig drawing board patterns.

Preferably, the alteration of the second pattern is at least one of a change to specifications, an addition, and a system change of the at least one of the parts, the electric circuits, and the wirings of the first pattern.

In the above configuration, the variations of the plurality of second pattern are generated by assuming a change to the specifications, an addition, and a system change, which are usually and frequently caused. Thus, accurate path plan is immediately provided.

Preferably, the wire harness is wired in a door portion of a vehicle, and wherein the simulator simulates a bending test of the wire harness wired in the door portion.

In the above configuration, the wire harness is wired in the door portion of the vehicle. Thus, the bending simulation relating to the wire harness of this door portion. Therefore, accurate life prediction of associated parts and a wire harness are enabled. Consequently, more accurate path plan drawing draft and jig drawing board draft can be provided.

Here, it is preferable that the wiring pattern information storage and the path pattern information storage are placed in a design department for designing the wire harness, wherein the modified wiring pattern generator, the simulator, the sub wiring pattern modifier, the jig arrangement pattern information generator, the jig arrangement pattern selector, the path plan generator, and the parts information storage are placed in a production department, connected to the design department through a communicator, wherein the path decision information and the alternation information are transmitted from the design department to the production department through the communicator, and wherein the path plan are transmitted from the production department to the design department through the communicator.

In the above configuration, a production preparation time and the number of man-hours can be reduced still more.

Here, it is preferable that the design department belongs to a car maker, and
wherein the production department belongs to a parts maker for manufacturing the wire harness.

In the above configurations, efficient wire harness production preparation to be performed between the carmaker and the parts maker is enabled.

Preferably, the system further comprising a storage, which stores at least one of the modified wire harness wiring pattern information, a result simulated by the simulator, the at least one of first sub pattern, the jig arrangement pattern information, the selected jig arrangement pattern, and the path plan.

Preferably, the simulator simulates an electric characteristic and a durability of the second pattern.

According to the present invention, there is also provided a method of preparing a wire harness production, comprising the steps of:
providing standard wire harness wiring pattern information related to a first pattern including parts, electric circuits, and wirings of a standard type vehicle;
generating modified wire harness wiring pattern information related to at least one second pattern in which at least one of the parts, the electric circuits, and the wirings of the first pattern is altered;
providing parts specification information including specifications of the parts, the electric circuits and the wiring included in the second patterns;
simulating whether each of the second patterns is practical while referring to the parts specification information;
modifying at least one of first sub patterns constituting the first pattern to at least one of second sub patterns so as to constitute the second pattern judged as practical by the simulation step;
providing wire harness path pattern information related to a plurality of wire harness path patterns of the standard type vehicle;
generating jig arrangement pattern information related to jig arrangement patterns prepared by applying at least one sub jig arrangement pattern to each of the wire harness path patterns;
providing path decision information, which selects one wire harness path pattern among the plurality of wire harness path patterns;
providing alternation information, which indicates at least one of alternation portions altered from the first pattern;
selecting one jig arrangement pattern corresponding to the selected wire harness path pattern among the plurality of wire harness path patterns; and
generating a path plan by integrating the modified second sub pattern having the alternation portions which is indicated in the alternation information and the selected jig arrangement pattern.

Preferably, the at least one of first sub patterns are modified by at least one of data concerning automatic machine conditions, special construction method verification, production requirements, and optimum circuit study.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1 is a basic configuration diagram illustrating an embodiment of a system for preparing a wire harness production of the invention;

FIG. 9A is an explanatory diagram illustrating a standard jig drawing board pattern according to this embodiment;

FIG. 9B is an explanatory diagram illustrating an example of jig information according to this embodiment.

DETAILED DESCRIPTION OF THE PREFERRED EMBODIMENTS

An embodiment of the invention is described below with reference to the accompanying drawings.

FIG. 1 is a basic configuration diagram illustrating an embodiment of a system for preparing a wire harness production of the invention. Hereunder, the system for preparing a wire harness production of the invention is described by taking a wire harness, which is wired in a rear door portion of a vehicle, as an example. Further, it is assumed that this embodiment is a system relating to an operation to be performed in a production preparation time before a production process of a wire harness starts. Further, FIGS. 2A to 9B are explanatory diagrams schematically illustrating various kinds of data, information and drawings to be handled or caused in this system for preparing a wire harness production.

As illustrated in FIG. 1, a design department and a production department are connected through a communication unit 17 in this embodiment that is the system for preparing a wire harness production of the invention. Although the design department and the production department may be present in the same company, both these departments may be provided so that the design department is provided in a carmaker, while the production department is provided in a parts maker commissioned by the carmaker to produce wire harnesses.

The design department is configured in such a way as to include a standard wire harness wiring diagram storage unit 1 and a path pattern storage unit 2. This standard wire harness wiring diagram storage unit 1 preliminarily stores a standard wire harness wiring diagram including information on parts, electric circuits, and wiring to be applied to a standard type vehicle. Further, the path pattern storage unit 2 preliminarily stores a plurality of path patterns of the wire harness, which respectively correspond to a plurality of variations derived by adding or altering the parts, electric circuits, and wiring to be applied to the standard type vehicle. Incidentally, the expression "standard type vehicle" indicates a normal type of vehicle among a plurality of types of vehicles. For example, what is called a standard specification car and what is called a standard grade car.

Figures 2A, 2B:
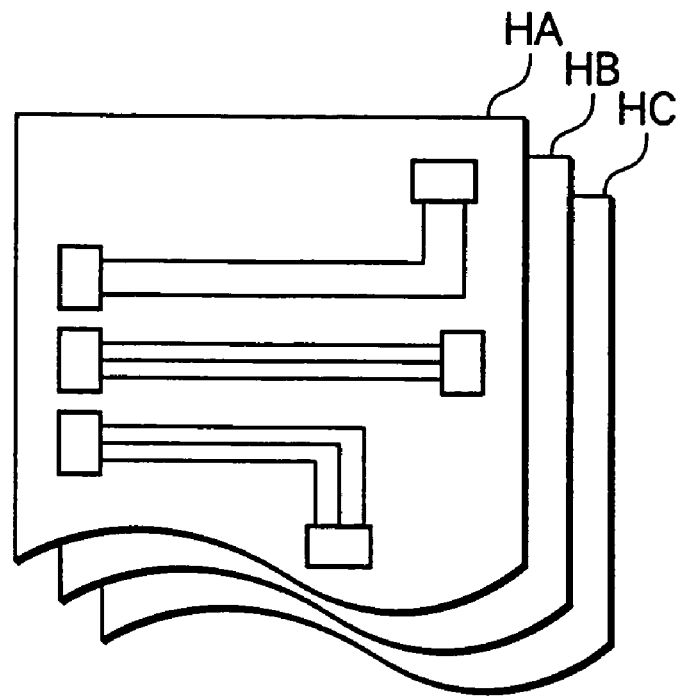
FIG. 2A is a diagram illustrating standard wire harness wiring diagrams according to this embodiment.
FIG. 2B is an explanatory diagram illustrating the standard wire harness wiring diagrams.

It is assumed that there are, for example, three kinds HA, HB, and HC of the standard wire harness wiring diagrams, which respectively correspond to a pattern A, a pattern B, and a pattern C, as illustrated in FIG. 2A. These patterns indicate examples of employing options one or all of options, for instance, an audio device (RAD), a door lock device (D/L), and a power window (P/W), as illustrated in FIG. 2A. That is, in the case of the pattern A, all the options RAD, D/L, and P/W. In the case of the pattern B, only the option PNV is employed. Further, in the case of the pattern C, only the option D/L is employed. Incidentally, a numeric value "10001" shown in FIG. 2B is a part number designating a specific part of a vehicle, more particularly, a rear door part in this case. The same holds true for each of the drawings (to be described later).

Figure 3:
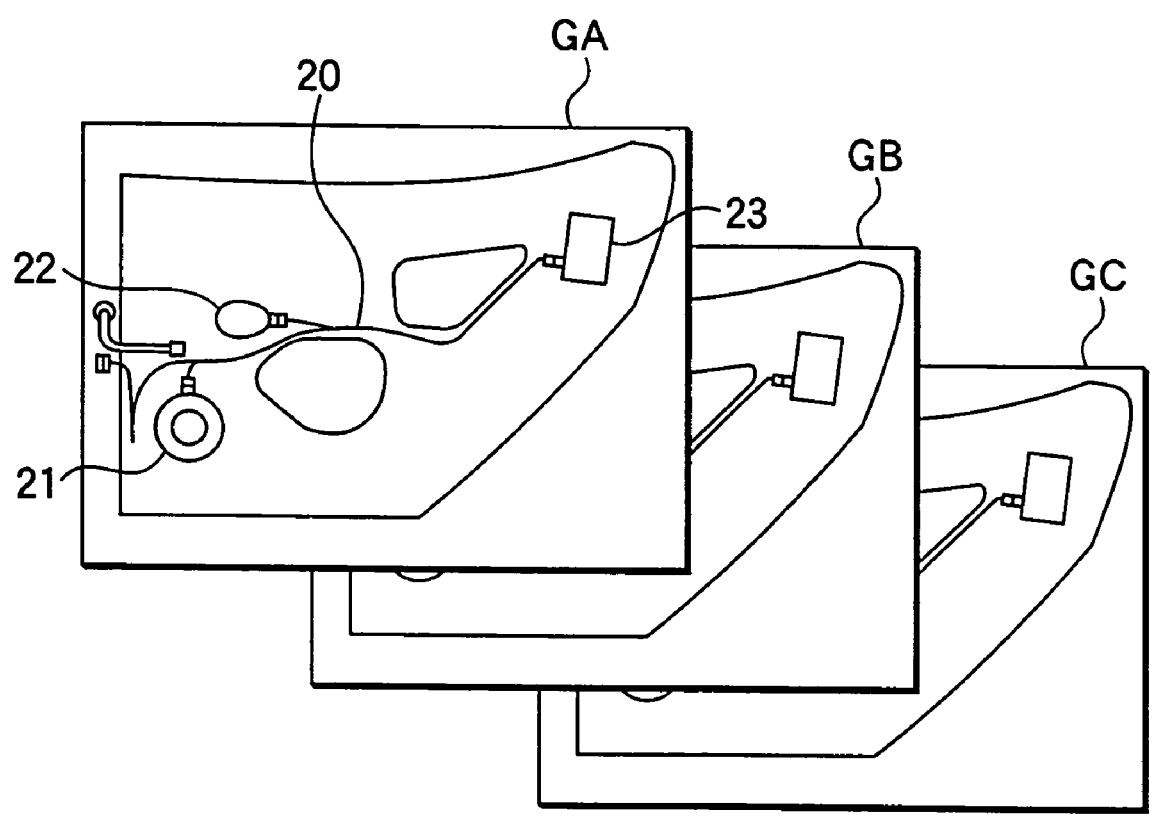
FIG. 3 is diagram illustrating path patterns according to this embodiment.

Further, as illustrated in FIG. 3, it is assumed that there are three kinds of the path patterns respectively correspond to the pattern A, the pattern B, and the pattern C shown in FIGS. 2A and 2B. For instance, the path pattern GA corresponding to the pattern A indicates that the wire harness 20 is connected to a speaker device 21, a motor device 22 for D/L, and a motor device 23 for P/W, which are needed when the wire harness 20 employ RAD, D/L and P/W, and that leads are wired so that the path length is minimized. The path patterns GB, and GC respectively correspond to the pattern B and the patter C indicate wire-harness wiring patterns (not shown) established by taking parts for accommodating devices, which are respectively needed by the patterns, into consideration.

On the other hand, the production department is configured in such a way as to include a wire harness wiring diagram pattern generation unit 3, a wire harness wiring diagram pattern storage unit 4, a standard subdrawing generation unit 5, a standard subdrawing storage unit 6, a simulation unit 7, a standard parts information storage unit 8, a simulation result storage unit 9, a new subdrawing generation unit 10, a new subdrawing storage unit 11, a standard jig drawing board pattern generation unit 12, a standard jig drawing board pattern storage unit 13, a jig drawing board pattern selection unit 14, a jig drawing board draft generation unit 15, and a path plan draft generation unit 16. Further, the production department is connected to the design department through the communication unit 17. In the case that the design department is included in a carmaker, and that the production department is included in a parts maker, the communication unit 17 includes leased lines and a transmitter-receiver device to be connected to the leased lines.

The wire harness wiring diagram pattern generation unit 3 generates a plurality of wire harness wiring diagram patterns respectively corresponding to a plurality of variations derived by addition or alteration of parts, electric circuits, and wires assumed from a standard wire harness wiring pattern, which is provided from the design department and includes information concerning parts, electric circuits, and wires applied to a standard type vehicle. The wire harness wiring diagram pattern storage unit 4 stores the plurality of wire harness wiring diagram patterns. Incidentally, when wire harness wiring diagram patterns are generated, the wire harness wiring diagram pattern generation unit 3 may refer to the path patterns stored in the path pattern storage unit 2.

Figures 4A, 4B:
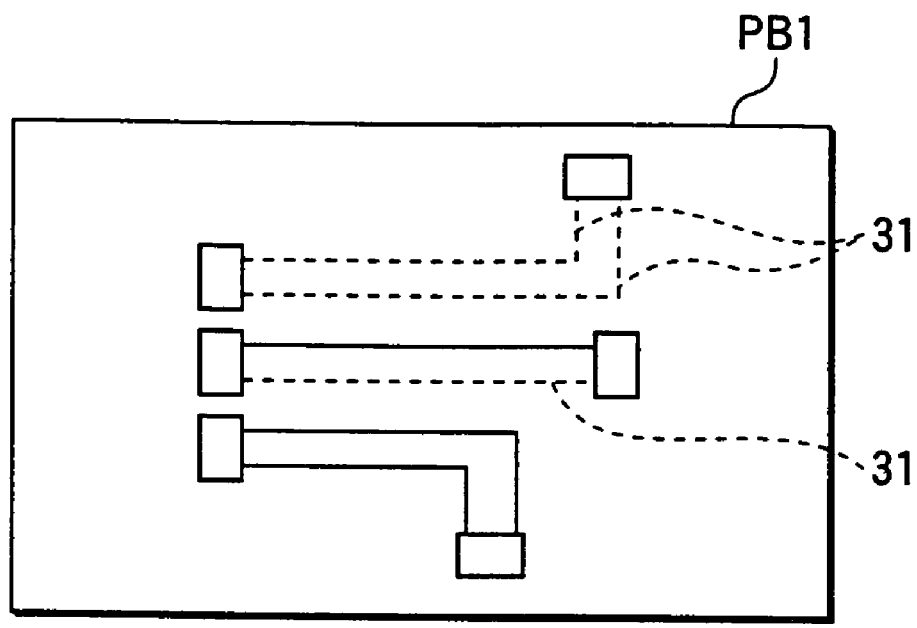
FIG. 4A is a diagram illustrating an example of a wire harness wiring diagram pattern according to this embodiment.
FIG. 4B is an explanatory diagram illustrating this example.
Figures 5A, 5B:
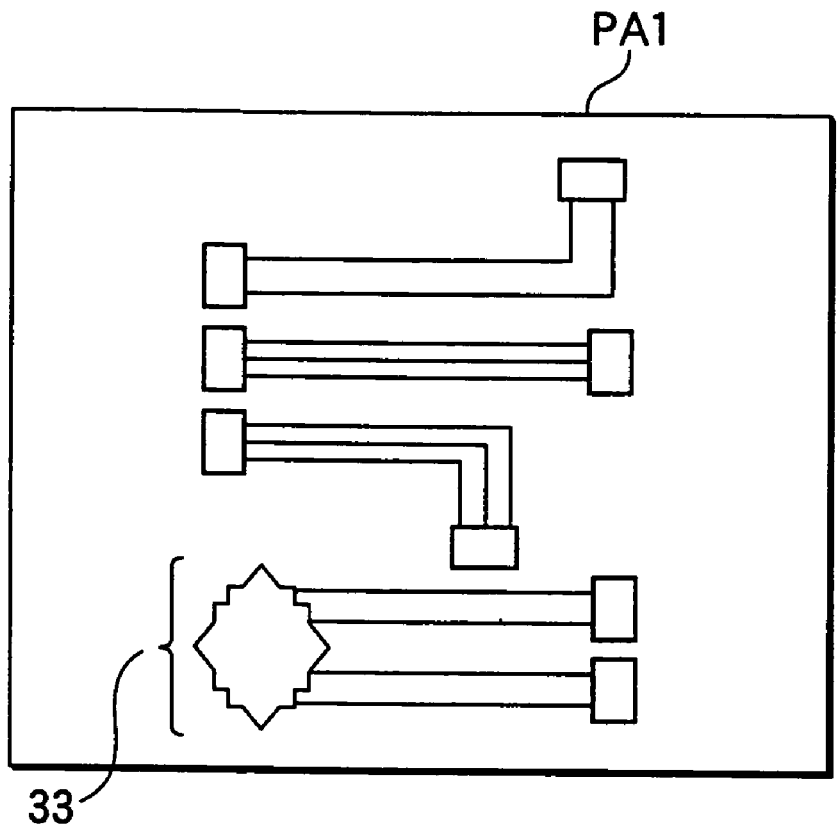
FIG. 5A is a diagram illustrating another example of a wire harness wiring diagram pattern according to this embodiment.
FIG. 5B is an explanatory diagram illustrating this example.
Figures 6A, 6B:
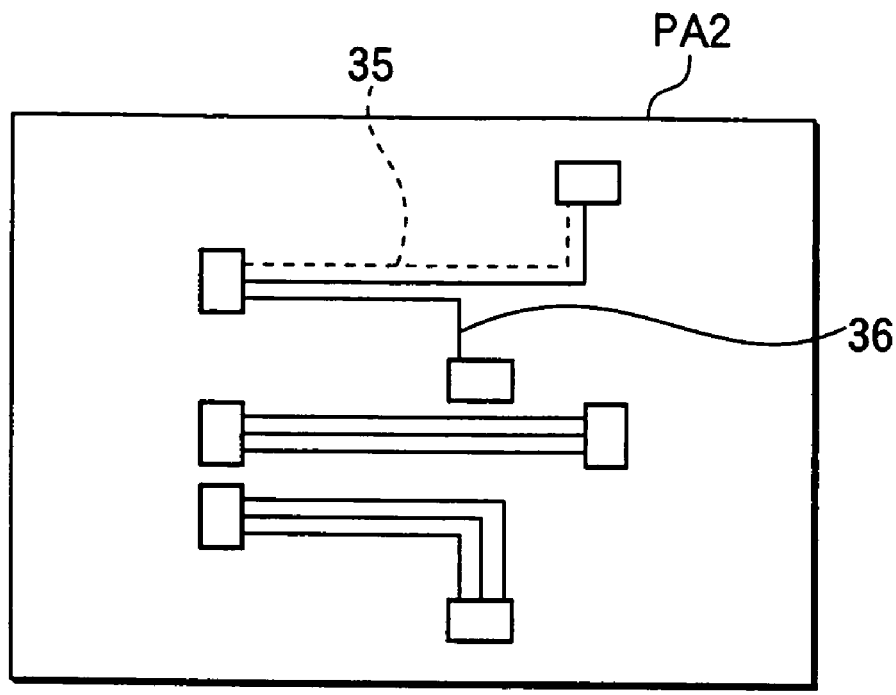
FIG. 6A is a diagram illustrating another example of a wire harness wiring diagram pattern according to this embodiment.
FIG. 6B is an explanatory diagram illustrating this example.

For example, FIGS. 4A, 5A, and 6A illustrate the plurality of wire harness wiring diagram patterns respectively corresponding to the plurality of variations derived by the assumed addition or alteration.

A wire harness wiring diagram pattern PB1 illustrated in FIG. 4A corresponds to a pattern obtained by adding D/L, which is designated by reference numeral 32 and is not employed in the pattern B initially, to the pattern B, as illustrated in FIG. 4B. Incidentally, in this case, it is assumed that there is no circuit change to be caused in D/L. In the wire harness wiring pattern PB1, the wire harness is changed in response to this addition, as indicated by reference numeral 31 in FIG. 4A.

A wire harness wiring diagram pattern PB1 illustrated in FIG. 5A corresponds to a pattern obtained by newly adding an entry lamp (E/L), which is designated by reference numeral 34, to the pattern A, as illustrated in FIG. 5B. To the wire harness wiring pattern PA1, a wire harness and associated parts are newly added in response to this addition, as indicated by reference numeral 33 in FIG. 5A. Incidentally, the differences between the example shown in FIGS. 5A and 5B and the example shown in FIGS. 4A and 4B is that the E/L, which is not employed in the pattern A, the pattern B, and the pattern C, is newly added to the example of FIGS. 5A and 5B, whereas the example of FIGS. 4A and 4B corresponds to what is called a change to the specification, according to which D/L originally employed in another pattern A is additionally employed in this wire harness wiring diagram pattern PB1.

A wire harness wiring diagram pattern PA2 shown in FIG. 6A corresponds to a pattern obtained by performing system change on D/L, which is originally employed and designated by reference numeral 37, to the pattern A, as illustrated in FIG. 6B. In response to this addition, the wire harness wiring pattern PA2 is changed so that an original wire harness is deleted, as indicated by reference numeral 35 in FIG. 6A, whereas a new wire harness is newly added thereto, as indicated by reference numeral 36.

Thus, the wire harness wiring diagram pattern generation unit 3 is adapted to generate variations of the plurality of standard wire harness wiring diagram by assuming changes to the specification, additions, and system changes, which may usually and frequently occur. Therefore, the wire harness wiring diagram pattern generation unit 3 contributes to immediate provision of a path plan draft as a practical one. Incidentally, in practical steps, a plurality of wire harness wiring diagram patterns corresponding to the assumed variations in addition to these three variations are generated and then stored by the wire harness wiring diagram pattern generation unit 3.

Figures 7A, 7B:
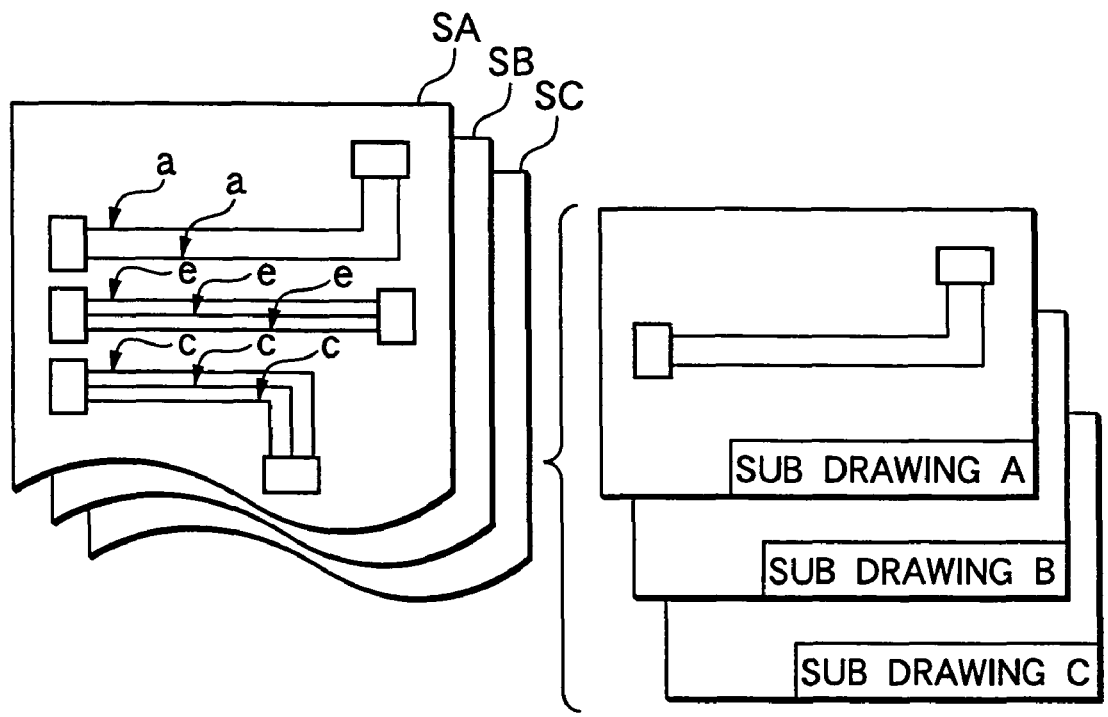
FIG. 7A is a diagram illustrating a standard subdrawing according to this embodiment.
FIG. 7B is an explanatory diagram illustrating this standard subdrawing.

The standard subdrawing generation unit 5 generates a plurality of standard subdrawings serving as constituent elements of the plurality of wire harness wiring diagram patterns, and causes the standard subdrawing storage unit 6 to store the generated standard subdrawings. Each of the wire harness wiring diagram patterns SA, SB, and SC is usually constituted by a combination of standard subdrawings, as illustrated in FIG. 7A. For instance, as illustrated in FIG. 7B, a wire harness wiring diagram SA corresponding to the pattern A is constituted by standard subdrawings a, c, and e. Similarly, a standard subdrawing SB corresponding to the pattern B is constituted by standard subdrawings a, b, c, d and e. A standard subdrawing SC corresponding to the pattern C is constituted by standard subdrawings a, c, and e.

The simulation unit 7 performs electric characteristic simulation tests and durability simulation tests on these circuits according to the plurality of wire harness wiring diagram patterns, and standard parts information preliminarily stored in the standard parts information storage unit 8. Further, results of the simulation tests are stored in the simulation result storage unit 9.

Figure 8A:
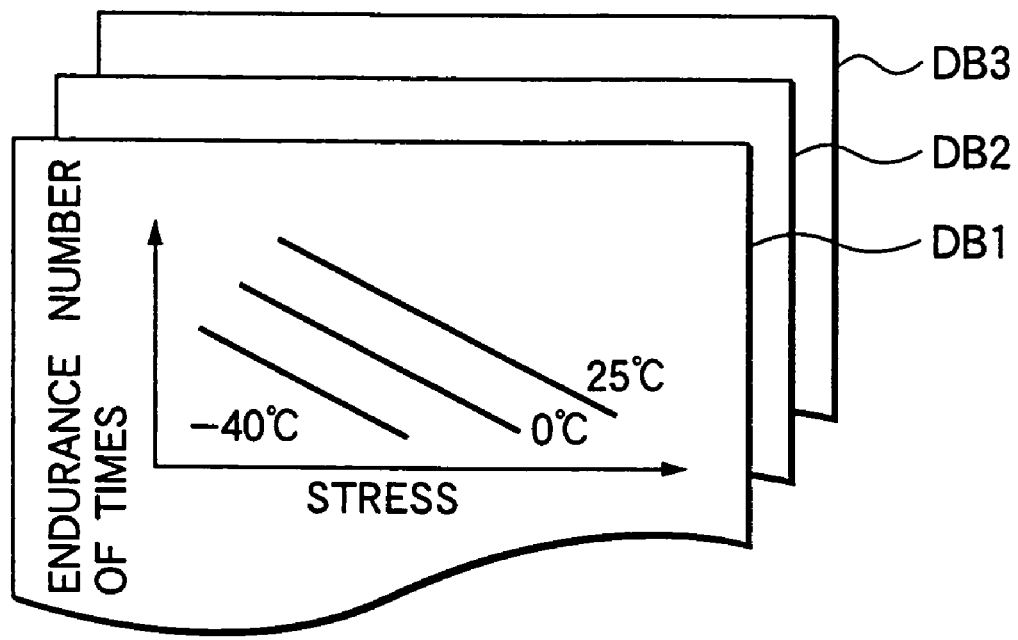
FIGS. 8A and 8B are explanatory diagrams illustrating examples of information compiled a database, which is obtained according to a simulation test in this embodiment.
Figure 8B:
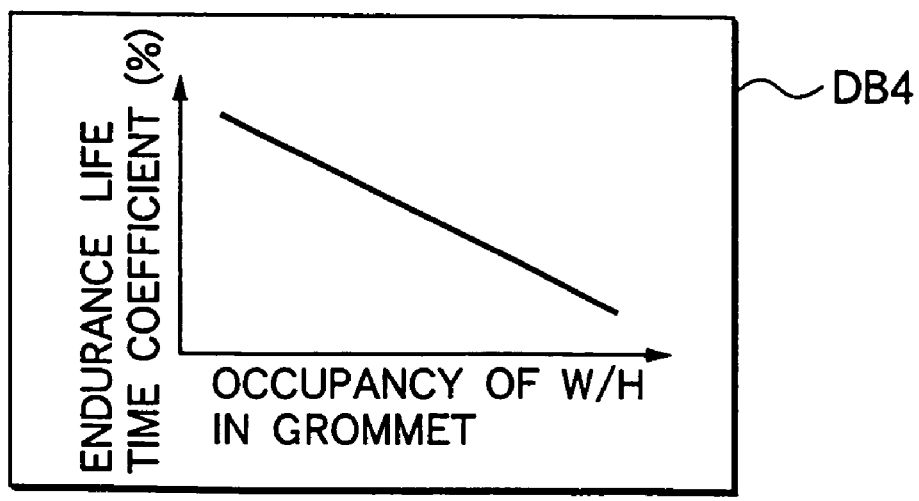
Figure 10:
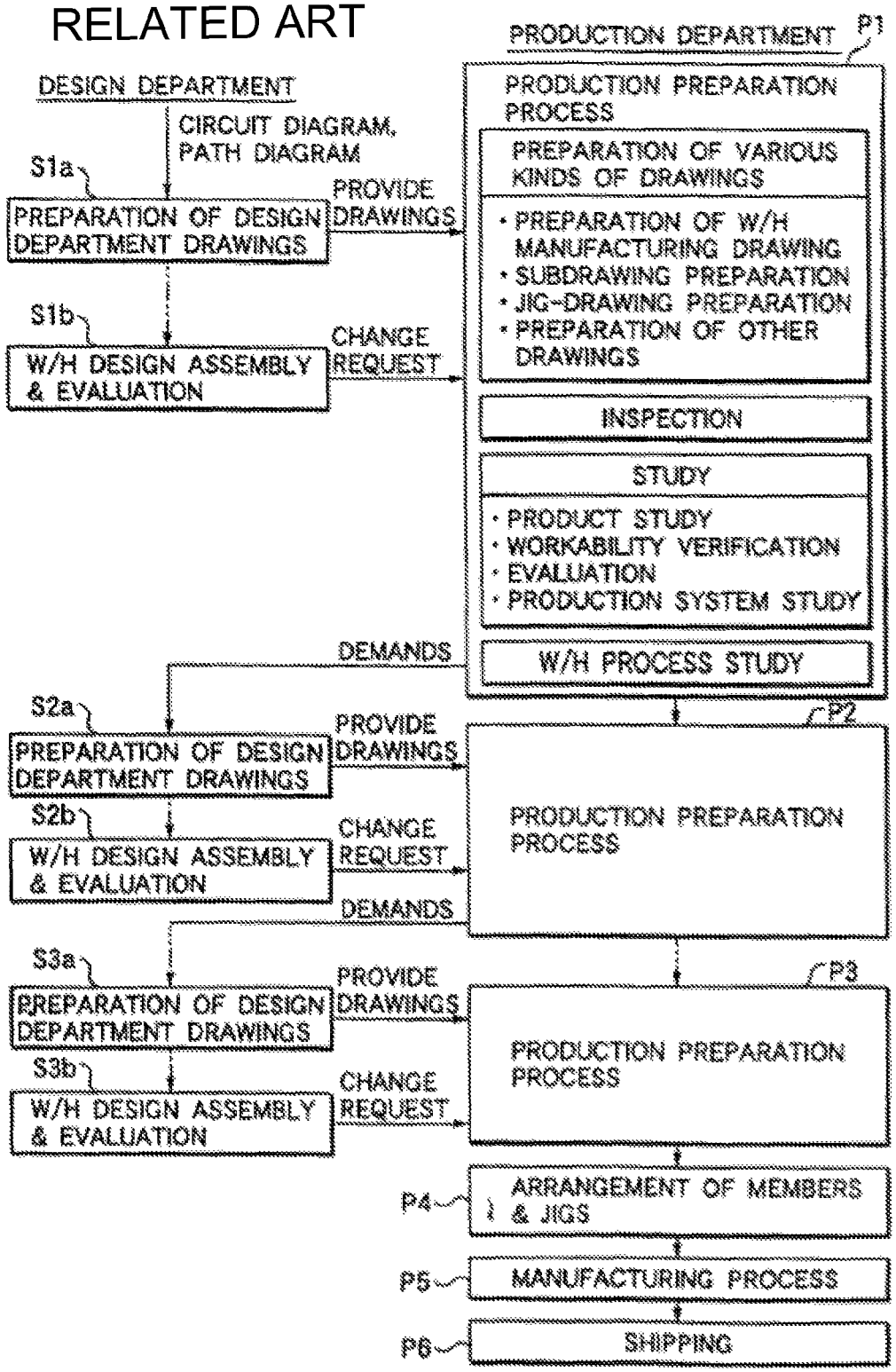
FIG. 10 is an explanatory diagram illustrating an example of an operation to be performed in a production preparation time in which preparation for production of a related vehicle wire harness is performed.

The standard parts information includes databased information obtained by preliminarily testing the relation between stress and durability at each temperature and the relation between occupancy and endurance of a wire harness in a grommet correspondingly to each wire kind and each wire diameter, as indicated by DB1, DB2, and DB3 of FIG. 8A and DB4 of FIG. 8B, in addition to inherent information concerning connectors and grommets.

According to such standard parts information, the simulation unit 7 performs life prediction in the case where the wire harness is free, and life prediction in the case where the wire harness is accommodated in a grommet. Especially, the accurate life prediction of a frequently bent part, such as a rear door portion, is enabled by utilizing a database illustrated in FIGS. 8A and 8B, and by performing simulation according to the wire kind, the wire diameter, the occupancy of the wire harness accommodated in the grommet. Further, a bending simulation using computer graphics, and tests for replicating a deflection characteristic and a jig characteristic may be performed.

Especially, accurate path plan draft and jig drawing board draft are enabled by performing the life prediction of the parts associated with a door portion and of the wire harness in the bending simulation.

Incidentally, in addition to the simulation test, the simulation unit 7 may assume a wire harness wired on an instrument panel and perform simulation tests of vibration characteristics, temperature characteristics and fuse characteristics. Further, the simulation unit 7 may assume a wire harness wired around an engine, and perform simulation test of vibration characteristics, temperature characteristics, fuse characteristics, waterproof characteristics, and soundproof characteristics.

The new subdrawing generation unit 10 generates new subdrawings according to data concerning automatic machine conditions, special construction method verification, production requirements, and optimum circuit study in addition to results of the simulation tests and a plurality of standard subdrawings. Then, the new subdrawing generation unit 10 causes the new subdrawing storage unit 11 to store the generated new subdrawings. The new subdrawing generation unit 10 generates new subdrawings by utilizing, for instance, predetermined production preparation tools and performing automatic machine condition verification, special construction method verification, production requirement study, and optimum circuit study. At that time, the new subdrawing generation unit 10 may be adapted to refer to results of simulation tests, which include wire kinds and wire diameters, and a plurality of standard subdrawings.

Thus, information, which is effective when the path plan drawing draft of an optimum wire harness is generated, can be provided by generating new subdrawings according to data concerning the automatic machine conditions, special construction method verification, production requirements, and optimum circuit study in addition to results of the simulation test, and a plurality of standard subdrawings.

On the other hand, the standard jig drawing board pattern generation unit 12 generates a plurality of standard jig drawing board patterns LA, LB, and LC respectively corresponding to path patterns GA, GB, and GC, as illustrated in FIG. 9A, according to a plurality of path patterns supplied from the design department and to jig information preliminarily stored in a jig information storage unit (not shown herein). The standard jig drawing board pattern generation unit 12 may be adapted to refer to the standard wire harness wiring diagrams stored in the standard wire harness wiring drawing storage unit 1. Incidentally, jig information is databased in such a manner as to include items, such as a platform, a car model, a part, a steering wheel, a grommet, a protector, R/B, and a part number. The standard jig drawing board pattern generation unit 12 first receives the path patterns and retrieves the jig information and calls all the associated jig board patterns. Thereafter, standard jig drawing board pattern generation unit 12 generates a plurality of standard jig drawing board patterns and causes the standard jig drawing doard pattern storage unit 13 to store such generated standard jig drawing board patterns.

Such plural standard jig drawing board patterns are generated according to the jig information and a plurality of path patterns preliminarily stored in the jig information storage unit. Hence, very practical standard jig drawing board patterns are generated.

Further, the jig drawing board pattern selection unit 14 selects an optimum jig drawing board pattern from the plurality of standard jig drawing board patterns, which are stored in the standard jig drawing board pattern storage unit 13, according to the circuit design information, which is provided from the design department, and path decision information, that is, information indicating which of the plurality of path patterns is employed.

The jig drawing board draft generation unit 15 generates a jig drawing board draft corresponding to the selected jig drawing board draft pattern. This jig drawing draft is, for instance, a 3D development drawing generated by using graphic tools, and transmitted to the design department together with data including the demand.

Further, when receiving diameter change information and addition/alteration information corresponding to the standard type vehicle, which are sent from the design department, the path plan draft generation unit 16 generates path plan drawing draft corresponding to the optimum wire harness according to the standard jig drawing board pattern information and the new subdrawing in addition to the results of the simulation tests and the plurality of standard subdrawing so that the optimum wire harness is determined in such a way as to reflect such information. At that time, the demands from the production department may be included therein. Further, Further, the generated path plan drawing draft is transmitted to the design department together with associated data.

The various units and the storage units provided in the production department are respectively implemented by software introduced into a personal computer (PC) and a storage apparatus, such as a hard disk, to be mounted on or connected to the PC.

In the above configuration, the wire harness wiring diagram pattern generation unit 3 generates a plurality of wire harness wiring diagram patterns corresponding to standard wire harness wiring diagrams, which include information concerning parts, electric circuits, and wirings applied to the standard type vehicle, and variations of a plurality of standard wire harness wiring diagrams, which are derived by addition/alteration of the parts, electric circuits, and wirings applied to the standard type vehicle. Further, the standard subdrawing generation unit 5 generates a plurality of standard subdrawings that are constituent elements of these wire harness wiring diagram patterns. The new subdrawing generation unit 10 generates new subdrawings. Furthermore, the simulation unit 7 performs simulation tests concerning electric characteristics and durability thereof according to a plurality of wire harness wiring diagram patterns, a plurality of path patterns of the plurality of wire harnesses corresponding to a standard type vehicle, and standard parts information. Furthermore, the data generated by these unit 3, 5, 7 and 10 are stored in the storage units 4, 6, 9, and 11. Moreover, the plurality of standard jig drawing board patterns respectively corresponding to a plurality of path patterns generated by the standard jig drawing board pattern storage unit 12 are stored in the standard jig drawing board pattern storage unit 13.

Further, when receiving alternation information corresponding to the standard type vehicle, the path decision information indicating which of a plurality of path patterns is employed, and circuit design information concerning the employed path pattern, the path plan draft generation unit 16 generates the path plan draft corresponding to an optimum wire harness according to the results of the simulation tests, a plurality of standard subdrawings, and a plurality of standard jig drawing board patterns. Further, the jig drawing board draft generation unit 15 generates a optimum jig drawing draft according to the path decision information, the circuit design information, and the standard jig drawing board patterns. Thus, when receiving the alternation information, the path decision information, and the circuit design information, the path plan drawing draft corresponding to the suitable wire harness, and the jig drawing board draft can be immediately provided.

More specifically, units for storing the standard wire harness wiring diagrams and the wire harness wiring diagram patterns are placed in the design department. Units for generating wire harness wiring diagrams, pattern standard subdrawings, standard parts information, and standard jig drawing board patterns, and the path plan diagram draft and the jig drawing board draft, and simulation unit are disposed in the production department. Further, the design department and the production department are connected to each other through the communication unit 17. Therefore, operations conforming to a job site of each of the departments can be efficiently performed. Moreover, when necessary, both the departments are enabled to communicate with each other. Furthermore, in the case that the design department belongs to a carmaker, and that the production department belongs to a parts maker, more efficient preparation for production of a wire harness can be performed. Consequently, a production preparation time and the number of man-hours can be reduced still more.

Thus, according to the embodiment, data needed for manufacturing a wire harness is generated by correcting only respects relating to the change according to a preliminarily prepared standard database. Therefore, the number of interchanges of data between the departments and that of iterative tasks caused at each change in a process of preparation for production of a wire harness, which are very large in a related system, are reduced. Consequently, a preparation time and the number of man-hours are considerably reduced. Furthermore, the production preparation time is more reduced by preliminarily generating or storing a plurality of standard subdrawings, standard parts information, and standard jig drawing board patterns.

Incidentally, it is assumed that a wire harness to be wired in the rear door portion is provided in the embodiment. A part, to which the invention is applied, is not limited to the rear door portion. Further, the drawings and data to be used in the system according to the invention are not limited to those exemplified in the foregoing description of the embodiment. Thus, such drawings and data may be changed in view of current conditions. Additionally, needless to say, various modifications made without departing from the technical idea of the invention are included in the scope of the invention.

What is claimed is:

1. A method of preparing a wire harness production, using a system for preparing a wire harness production having standard wire harness wiring pattern information related to a first pattern including parts, electric circuits, and wirings of a standard type vehicle; a modified wiring pattern generator, which generates modified wire harness wiring pattern information related to at least one second pattern in which at least one of the parts, the electric circuits, and the wirings of the first pattern is altered; a parts information storage, which stores parts specification information including specifications of the parts, the electric circuits and the wiring included in the second patterns; a simulator, which simulates whether each of the second patterns is practical while referring to the parts specification information; a sub wiring pattern modifier, which modifies at least one of first sub patterns constituting the first pattern to at least one of second sub patterns so as to constitute the second pattern judged as practical by the simulator; wire harness path pattern information related to a plurality of wire harness path patterns of the standard type vehicle; a jig arrangement pattern information generator, which generates jig arrangement pattern information related to jig arrangement patterns prepared by applying at least one sub jig arrangement pattern to each of the wire harness path patterns; path decision information, which selects one wire harness path pattern among the plurality of wire harness path patterns; alternation information which indicates at least one of alternation portions altered from the first pattern; a jig arrangement pattern selector, which selects one jig arrangement pattern corresponding to the selected wire harness path pattern among the plurality of wire harness path patterns; and a path plan generator, which generates a path plan by integrating the modified second sub pattern having the alternation portions which is indicated in the alternation information and the selected jig arrangement pattern, said method comprising the steps of:

providing the standard wire harness wiring pattern information related to the first pattern including parts, the electric circuits, and the wirings of a standard type vehicle;

generating the modified wire harness wiring pattern information related to the at least one second pattern in which at least one of the parts, the electric circuits, and the wirings of the first pattern is altered;

providing the parts specification information including the specifications of the parts, the electric circuits and the wiring included in the at least one second pattern;

simulating whether the at least one second pattern is practical while referring to the parts specification information;

modifying the at least one of first sub patterns constituting the first pattern to the at least one of second sub patterns so as to constitute the second pattern judged as practical by the simulating step;

providing the wire harness path pattern information related to the plurality of wire harness path patterns of the standard type vehicle;

generating the jig arrangement pattern information related to the jig arrangement patterns prepared by applying the at least one sub jig arrangement pattern to each of the wire harness path patterns;

providing the path decision information, which selects the one wire harness path pattern among the plurality of wire harness path patterns;

providing the alternation information, which indicates the at least one of alternation portions altered from the first pattern;

selecting the one jig arrangement pattern corresponding to the selected wire harness path pattern among the plurality of wire harness path patterns;

generating the path plan by integrating the modified second sub pattern having the alternation portions which is indicated in the alternation information and the selected jig arrangement pattern; and outputting the path plan.

2. The method as set forth in claim 1, wherein the at least one of first sub patterns are modified by at least one of data concerning automatic machine conditions, special construction method verification, production requirements, and optimum circuit study.

* * * * *